United States Patent [19]

Lee

[11] Patent Number: 5,115,676
[45] Date of Patent: May 26, 1992

[54] FLUSH-MOUNTED PRESSURE SENSOR

[75] Inventor: Shih-Ying Lee, Lincoln, Mass.

[73] Assignee: Setra Systems, Inc., Acton, Mass.

[21] Appl. No.: 463,247

[22] Filed: Jan. 10, 1990

[51] Int. Cl.[5] ............................ G01L 7/08; G01L 9/12
[52] U.S. Cl. ......................................... 73/706; 73/724;
73/756; 361/283
[58] Field of Search ................ 73/706, 715, 724, 756,
73/730, 716; 361/283

[56]  References Cited
U.S. PATENT DOCUMENTS

| 2,368,278 | 1/1945 | Warshaw | 73/724 |
| 3,482,449 | 12/1969 | Werner | 73/706 |
| 3,581,572 | 6/1971 | Frick | 73/706 |
| 3,859,575 | 1/1975 | Lee et al. | 73/724 |
| 4,227,418 | 10/1980 | Bonner et al. | 73/724 |
| 4,382,377 | 5/1983 | Kleinschmidt et al. | 73/706 |

Primary Examiner—Donald O. Woodiel
Attorney, Agent, or Firm—Wolf, Greenfield & Sacks

[57] ABSTRACT

A flush-mounted sensor measures the pressure of a fluid at a given point of a fluid system such as a container or conduit. A sensor head edge-mounts an isolating diaphragm responsive to the pressure of the fluid. The isolating diaphragm has a small diameter in comparison with the dimensions of the fluid system, is adjacent to the fluid in the system to reduce the dead volume of fluid adjacent the diaphragm and may be formed of a material that is compatible with the fluid. A drive rod mechanically couples the isolating diaphragm to a second diaphragm of a variable capacitor assembly, preferably one of the center-mounted type where the diaphragm is one plate of the capacitor. The second diaphragm is also edge-mounted and produces a counterforce acting on the side of the isolating diaphragm opposite the side adjacent the fluid. The force of the fluid pressure acting on the isolating diaphragm is transmitted by the drive rod to the second diaphragm where changes in the capacitance correspond to changes in the pressure.

9 Claims, 3 Drawing Sheets

FLUSH-MOUNTED PRESSURE SENSOR

BACKGROUND OF THE INVENTION

This invention relates in general to pressure transducers (or transmitters) and more specifically to a transducer that is flush-mounted with a small fluid dead volume open to a fluid system whose pressure is to be measured.

In many industrial applications, such as in semi conductor, food and pharmaceutical products process control, a high degree of cleanliness is required. The ability to clean a system is correlated, in part, with a minimum of dead volume of fluid associated with the pressure measurement. A dead volume is typically a region of comparatively stagnant fluid in a transducer between the fluid held in a container or conduit and a pressure responsive element, typically an edge mounted diaphragm. Dead spaces affect the cleanliness of the system because any dead spaces in the conduit can trap a portion of the fluid and collect contaminants. When measuring the pressure of a fluid flowing in a conduit, dead volumes may also interfere with the smooth, laminar flow of the fluid. Cleanliness is a particularly important consideration in semi-conductor manufacturing processes where it is important to know the fluid pressure, but it is also necessary to maintain extreme purity of the fluids even though different fluids may flow through the same conduit at different times, e.g. up to one part per billion. In addition to control of dead volumes, it is also important to have a minimum surface area of the transducer or transmitter exposed to the fluid, and any exposed surface should have a finish that is highly smooth.

To provide this extreme level of purity it has heretofore been necessary to dismantle the conduit and/or pressure transducer manually, and then clean all of the regions accessible to the fluids. This cleaning operation is costly and time consuming since the semi conductor manufacture is stopped during the cleaning. There are also many situations, regardless of cleanliness requirements, where a fast dynamic response is essential. This operational characteristic requires a minimum volume of fluid in the transducer. (As used herein, transducer will be understood to include devices known in the trade as transducers which produce a voltage signal output in response to an applied fluid pressure input and devices known in the trade as transmitters which produce a current signal output.)

A pressure sensor in such process control applications is typically mounted in a threaded opening formed in the wall of the container or conduit, or onto a fitting mounted on the outside surface of the wall. In either case, conventional sensors have a closed end and there is a significant dead space within the sensor where fluids are trapped and non-fluid contaminants can collect. Also such sensors have a comparatively large surface area exposed to the fluid which can trap contaminants.

It is also advantageous for a pressure sensor to be of small size. Typically, the smaller the size, the easier it is for the transducer to fit into a constricted operating environment and attach to a wide variety of sizes and shapes of conduits and containers.

One well known device for measuring closed end fluid pressure is the Bourdon tube. The tube is a closed end conduit which is curved. Its open end is connected to the fluid whose pressure is to be measured. The application of a fluid pressure to the interior of the tube produces a hydraulic or pneumatic force which tends to straighten the tube. The degree of movement of the tip of the tube measures the applied fluid force. A limitation of the Bourdon tube is that because it has a closed end it cannot be used in flow through situations. It is inherently non compact and susceptible to thermal errors. Also it has a large surface area exposed to the fluid, a large volume and is difficult to clean.

The use of variable capacitance in pressure transducers to measure the applied pressure is also well known. One successful configuration is a "center mounted" pressure transducer described in U.S. Pat. No. 3,859,575 where one electrode is mounted to the center of a edge mounted diaphragm. This construction itself, however, does not solve the aforementioned, and often competing, design problems. If the transducer assumes the form shown in FIG. 1 of that patent, there is a substantial inactive volume of fluid within the transducer which leads to the cleanliness and dynamic response problems noted above. If the diaphragm is mounted adjacent the fluid in the conduit, as shown in FIG. 3 of that patent, the diaphragm is in contact with the fluid which raises the fluid compatibility problems noted above. Corrosion resistant materials in general are not the best in terms of the mechanical properties, particularly their elastic properties such as a good hysteresis response and low creep. Further, if the sensor is used in a high pressure range, the diaphragm exposed to the fluid must be relatively thick to withstand the fluid force. However, such a thick diaphragm will exhibit only a small deflection, which in turn will produce a small change in the measured capacitance with an attendant poor signal-to-noise ratio.

It is therefore a principal object of the present invention to provide a pressure transducer that is flush mountable to produce a very small dead volume of fluid within the transducer acting on a pressure responsive diaphragm and a comparatively small surface area exposed to the fluid.

Another object of this present invention is to provide a pressure transducer with the foregoing advantages that has a highly compact point of attachment to the conduit.

A further object of the present invention is to provide a diaphragm adjacent the fluid which is compatible with the fluid and yet which has an accurate and reliable response and which also can operate at both high and low pressure ranges.

Still another object of the present invention is to provide a transducer with a good dynamic response.

A further object of the present invention is to provide a transducer with the foregoing advantages that has a comparatively simple construction and a favorable cost of manufacture.

SUMMARY OF THE INVENTION

A sensor that measures the pressure of a fluid in a system, typically a fluid flowing through a principal conduit or at a certain point of a pressure vessel, has a sensor head that edge mounts a first, isolating diaphragm mechanically coupled to a second, sensor diaphragm by a drive rod. The isolating diaphragm is formed of a material type and thickness that is compatible with the fluid and which serves as a mechanism to convert a fluid pressure signal into a force signal. The magnitude of the force produced corresponds to the pressure of the fluid. This force is transmitted to the second diaphragm by the drive rod. In one form, the front or isolating diaphragm should be thin enough that it contributes very little to the overall rigidity of the transducer.

In a preferred embodiment of the present invention, the second, sensor diaphragm acts as one electrode of a variable capacitor. The drive rod is rigid and firmly coupled between the isolating and sensor diaphragms to transmit the force acting on the isolating diaphragm to the sensor diaphragm where it is converted into a corresponding change in the capacitance. In addition, the deformation of the second sensor diaphragm acts through the drive rod as a resilient counterforce to the force generated by the isolating diaphragm. The second diaphragm therefore supports the smaller, usually thinner isolating diaphragm, typically at its center, to enable it to withstand the forces produced by high pressure applications without thickening the isolation diaphragm to the point that it deflects a very small amount and has a poor signal-to-noise ratio. A movable electrode is supported on, spaced from, and insulated from the sensor diaphragm.

In one embodiment the sensor head is screwed into a threaded opening formed directly in the wall of a conduit or a pressure vessel, or in a fitting secured to the conduit, with a metal gasket forming a fluid seal on a flange around the opening. In another embodiment, the sensor head has a flange that is captured between mating threaded fittings secured to the conduit around the opening.

These other features and objects of the present invention will be more readily appreciated from the following detailed description of the preferred embodiments which should be read in light of the accompanying drawings.

DETAILED DESCRIPTION OF THE PREFERRED EMBODIMENTS

Figure 1:
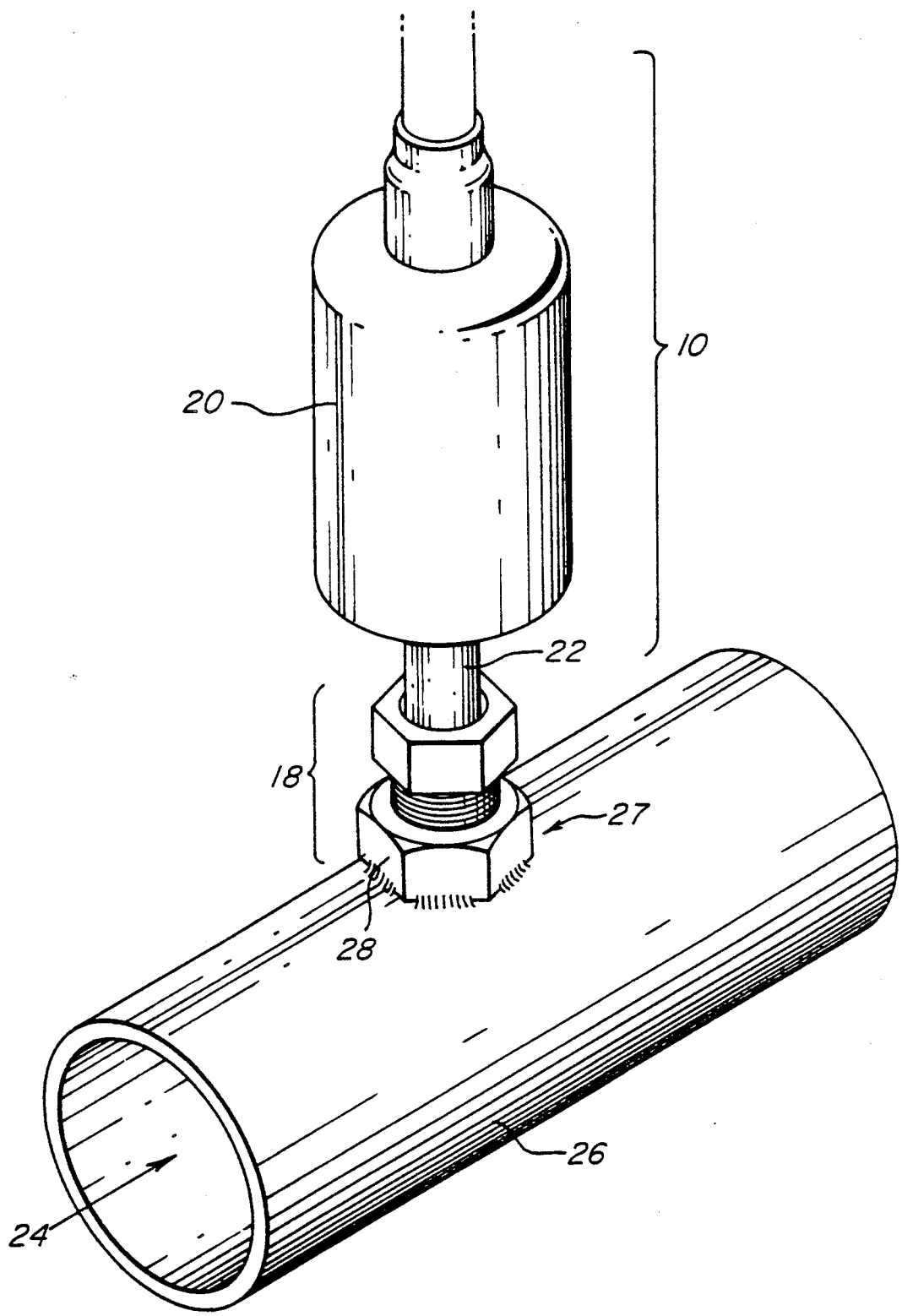
FIG. 1 is a view in perspective of a flush mount transducer according to the present invention mounted on a conduit.
Figure 2:
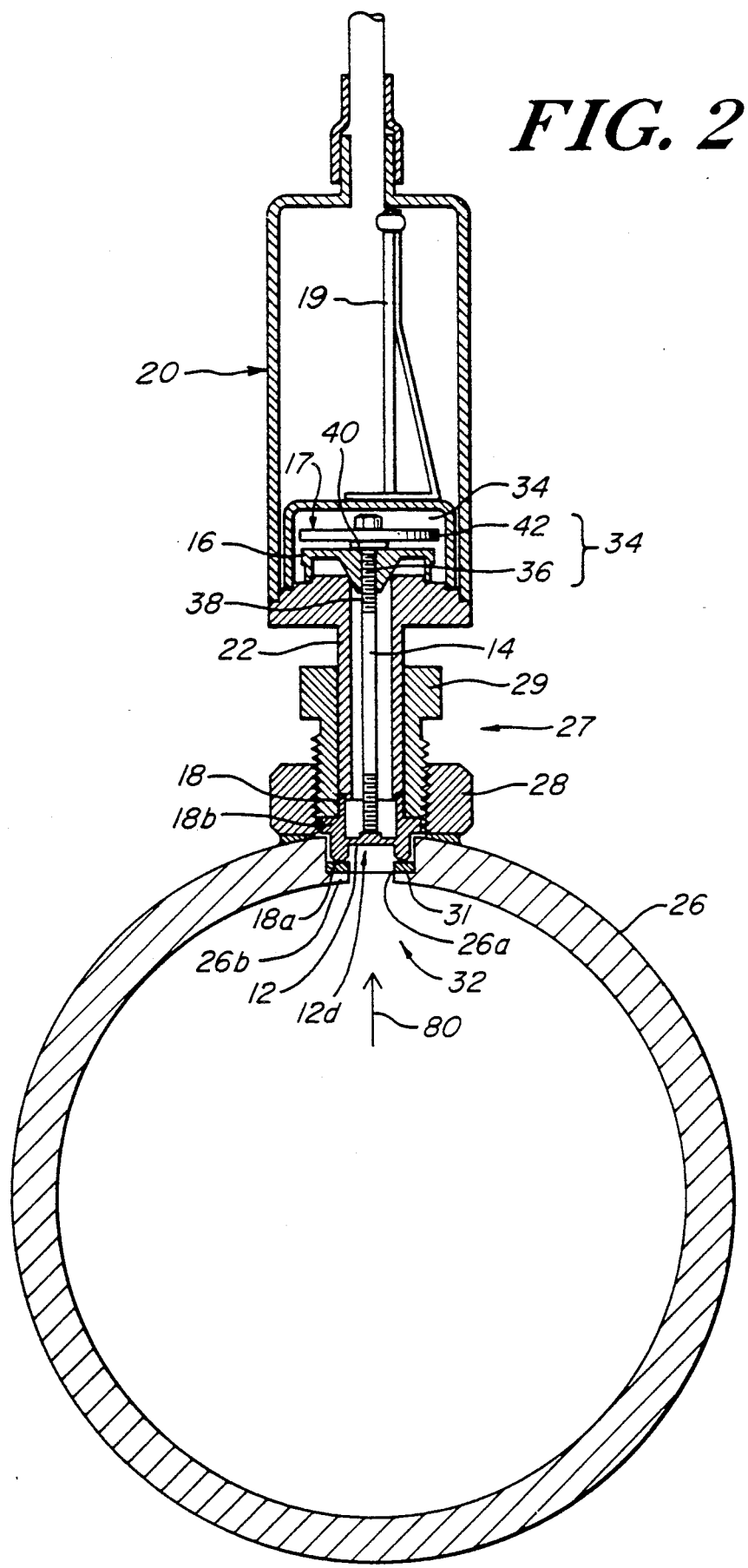
FIG. 2 is a view in cross section of the transducer shown in FIG. 1.
Figure 3:
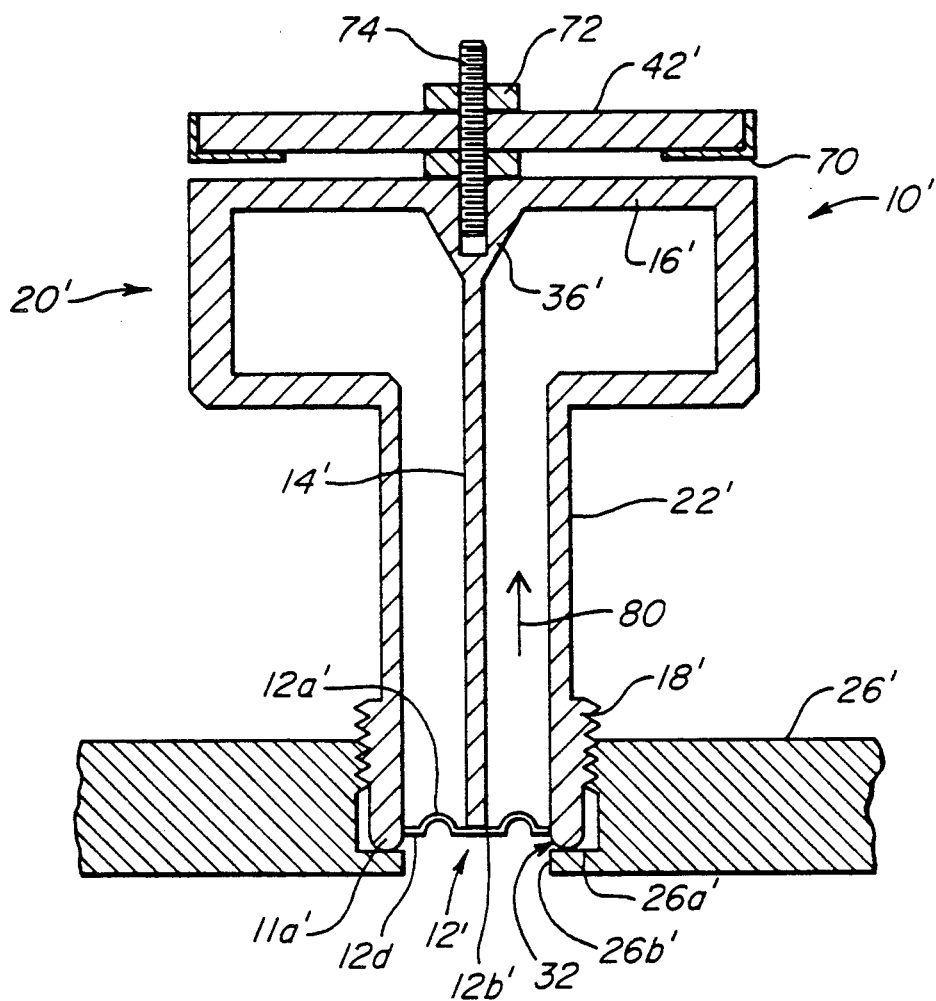
FIG. 3 is a view in vertical section of an alternative embodiment corresponding generally to FIG. 2.

FIGS. 1-3 show flush mounted pressure transducers 10 and 10' according to the present invention. The invention features a small (for certain applications) isolating diaphragm 12 made of a material which is compatible with a process fluid. The diaphragm is edge-mounted, but, significantly, is supported at its center, and therefore can be relatively thin and relatively flexible. The diaphragm is exposed at a first face 12d to the fluid and the fluid pressure produces a force over the diaphragm 12 to produce a force that corresponds to the applied pressure. The diaphragm 12 is mounted so that it is generally aligned with the adjacent container wall of the fluid system (as shown, conduits 26 and 26') to present a small dead volume of fluid adjacent the diaphragm and to be flush with the wall. Although the invention is illustrated and described with reference to measurement of the pressure of a fluid flowing or standing in a conduit 26, the invention can be used with a wide variety of fluid systems. In particular, it can readily be mounted on the wall of a fluid container or pressure vessel, and the wall can be flat or curved. Therefore the terms "conduit", "container", and "fluid system" as used herein should be read broadly to include containers, vessels, pipes, lines and fittings of all types.

The diaphragm is force "gathering" or force summing. This "gathered" force is transmitted through a rigid drive rod 14 to a second sensor diaphragm 16 removed from the isolating diaphragm 12. The sensor diaphragm 16 measures the force gathered at the diaphragm 12 and provides a supporting counterforce It is made of a material with good elastic properties (e.g. hysteresis and creep) and is edge mounted. Since it is not in contact with the fluid, it need not satisfy any fluid compatibility o size requirements discussed above. For use with certain standard diameter conduits, the isolating diaphragm 12 has a diameter of about ¼ inch.

The force transmitted to the sensor diaphragm 16 through the drive rod 14 causes the sensor diaphragm to bow in the direction of arrow 80. (The direction of the "gathered" force vector is transverse to the diaphragm 12, and usually generally perpendicular to the diaphragm, in the direction 80.) A key aspect of the present invention is that this linkage of a sensor diaphragm to the isolation diaphragm through a rigid link arm allows the use of a small, responsive, edge-mounted diaphragm that would otherwise be unable to resist the fluid forces, particularly forces in the high pressure range. This linkage also allows the small isolation diaphragm 12 to respond generally linearly to applied fluid forces with a sufficiently accurate output signal, particularly forces in the high pressure range. This arrangement also is significant because it places the isolation diaphragm very close to the fluid to be measured. The isolation diaphragm is mounted to be substantially flush with the wall of a conduit 26 carrying the fluid This arrangement has not been possible heretofore because the sensor diaphragm 16 is too large or too thick for such a mounting arrangement. If it is mounted away from the conduit 26, there is a significant dead volume between the fluid carrying passage and the diaphragm.

Preferably, the sensor diaphragm 16 forms part of a variable capacitor 17 such as the "center mounted" type capacitor described in U.S. Pat. No. 3,859,575. This "center-mounted" capacitor has two capacitance plates coupled to one another at their centers. The sensor diaphragm forms one plate of the capacitor. An increase in fluid pressure, which produces a bowing of the diaphragm 16 also in the direction 80, causes increased separation between the plates. As the plates move away from each other, the capacitance decreases and may be sensed by known measuring systems such as the circuit described in U.S. Pat. No. 4,093,915. This circuit is preferably formed on a printed circuit board 19.

The flush-mounted pressure sensor 10 includes a sensor head 18 that edge-mounts the isolating diaphragm 12, sensor body 22 and a cover 20 secured on the sensor body 22 to enclose the capacitor 17 and the P.C. board 19. A fluid 24 in the conduit 26 exerts a fluid pressure on the interior surface of the conduit. The transducer 10 is replaceably mounted on the conduit 26 using a chemically inert fitting 27 such as known metal gasket fittings. In particular, the sensor head 18 has a circular, metal gland 18a of semi-circular cross section projecting axially to engage either a mating flat surface 26a formed in the wall of the conduit on a flange 26b, or, as shown, a conventional metal gasket 31 seated on the surface 26a. The metal gasket preferably has a soft metal such as copper or nickel adjacent the gland to enhance the reliability of the seal In the FIG. 2 embodiment the sensor head is threaded in mating threads formed in a fitting 28 welded or otherwise secured to the conduit 26 at its outer surface or formed directly in the walls of the conduit (FIG. 3), provided that the wall is sufficiently thick to accommodate the thread. When the sensor head is tightened to the wall or fitting, the gland 18a is forced into a metal to metal seal with the surface 26a or the metal gasket 31.

Typically, the isolating diaphragm 12 is generally circular in configuration with a small diameter. For example, for use with conduits having an inside diameter of 1" inch, the diaphragm 12 has a diameter of less than ¼ inch (about 6 mm). As shown, the diaphragm 12 has a central boss of increased thickness at the point of contact between an end of the drive rod and the diaphragm. Also the isolating diaphragm is shown as being formed integrally with the sensor head, but it can be formed as a separate piece that is connected in a conventional manner such as welding. The diaphragm 12 is disposed immediately adjacent the fluid flow 24 in the conduit 26; it is therefore "flush mounted".

The material forming the isolating diaphragm 12 should have a yield strength sufficient to withstand the applied fluid pressures for the expected pressure range during operation, given the fact that the diaphragm is supported at its center by the presence of the drive rod and sensor diaphragm. For certain applications where resistance to corrosion by the fluid carried in the conduits is an important consideration, it may be necessary to us certain inert materials for the isolating diaphragm. For general applications, it has been found that certain types of stainless steel such as 316L provide the desired degree of resistance to corrosion together with the desired elasticity, elastic memory, and yield strength. The sensor head 18 is preferably formed of a structural material such as stainless steel which when properly made can have a highly smooth finish that is free of minor niches, crevices, or other irregularities. The interior contours of the sensor head 18 surrounding the isolating diaphragm 12 are rounded to facilitate a smooth polished surface to minimize the accumulation of contaminants.

The drive rod 14 is coupled rigidly between the diaphragms 12 and 16 to transmit efficiently a displacement of the isolating diaphragm 12 to the sensor diaphragm 16. The term "rigid" is used to connote that there is substantially no play or lost motion at the coupling along the direction of the coupling and substantially no elastic deformation (compression) of the rod itself along its longitudinal axis (the direction 80) in response to the applied forces. The rod is therefore formed of a strong and comparatively incompressible material. Stainless Steel is preferred. Using such a rod linkage, the isolating diaphragm 12 satisfies the requirement of small size and inertness while the sensor diaphragm 16 can be positioned at some distance away from the fluid. The sensor diaphragm 16 can be considerably larger than the isolating diaphragm and of suitable elastic material, which need not be compatible with the fluid 24.

FIG. 2 shows a preferred embodiment for a flush mounted pressure sensor according to the present invention. The sensor head 18 initially has a generally circular interior cross section viewed transversely to the longitudinal axis of the sensor (along the drive rod 14). The sensor head 18 is sealed within a circular opening 32 in the wall of the conduit 26. A screw member 29 threads into the fitting 28 and drives the head 18 toward the conduit 26 by engaging an annular flange 18b. This drives the gland 18a against either the soft metal gasket 31, or directly against the surface 26a to produce a reliable line seal at the gland 18a. The line of sealing is near the fluid and does not allow the fluid to reach dead volumes such as the space between the head 18 and the opening 32.

Preferably one end 38 of the drive rod 14 is threaded into a boss 36 formed at the center of the sensor diaphragm 16. The drive rod means 14 abuts and resistance welded to the boss of the isolating diaphragm. The sensor diaphragm 16 is preferably made of material with good elastic properties, such as high strength tool steel. It is generally larger, and more rigid and therefore capable of withstanding the force gathered and transmitted by the isolating diaphragm than the isolating diaphragm itself. It provides the principal source of resistance to a displacement of the isolating diaphragm in response to applied fluid forces. An insulator 40 such as glass bead or a mounting post with an annular insulator, supports an electrode 42 at the center of the diaphragm opposite the threaded boss and drive rod.

FIG. 3 shows an alternative embodiment similar in construction to that shown in FIG. 2 where the sensor head 18' is threaded directly into the wall of the conduit 26' with the metal gasket 31 sanwiched between the surface 26a and the gland 18a'. Also, the sensor diaphragm 16' is formed as the upper wall of a sensor body 20'. A drive rod 14' couples an isolating diaphragm 12' to the sensor diaphragm 16'. The isolating diaphragm has an annular, convolution 12a' around a central region 12b' that receives one end of the drive rod. The convolution 12a' is bowed in the direction that the diaphragm 12 would deform as a result of a fluid pressure in the conduit 26. This convolution 12a' reduces the stress at the edge mounting of the diaphragm 12' when it deflects under the application of pressure, particularly high pressures. The convolution also reduces stress in the diaphragm at the rod supported central portion 12b'. The movable electrode carries a peripheral conductive coating 70 that acts as one electrode of the variable capacitor.

There has been described a sensor which is flush mounted, presents no significant dead volumes within the sensor, and has a small surface area exposed to the fluid, being measured. When used in a flow through mode, the sensor may be cleaned with a high degree of reliability without contaminating a subsequent fluid flow with material from a preceding fluid flow in the same conduit. The sensor is compact, especially at its head, can be readily adapted to variety of fluid containers, conduits and systems, has a comparatively low cost of construction, is readily assembled, and is accurate and reliable in operation. The sensor also is compatible with the fluid, can operate a high pressure range, and exhibits a good dynamic response.

Various alterations and modifications will occur to those skilled in the art from the foregoing detailed description of the invention and accompanying drawings. Such variations and modifications are intended to fall within the scope of the appended claims.

What is claimed is:

1. A sensor for measuring the pressure of a fluid in a container comprising:
   a. a first diaphragm in contact with the fluid at a first face and capable of converting the pressure of the fluid to a force at the center of the diaphragm directed in a first direction generally perpendicular to the diaphragm;

b. a second diaphragm displaced along said first direction from said first diaphragm;

c. a drive rod mechanically coupled at one end to the first diaphragm at a second face opposite said first face and at the other end to said second diaphragm, said coupling (i) having substantially no lost motion, (ii) being substantially rigid to resist elastic deformation along said first direction in response to said force, and (iii) extending freely between said first and second diaphragms; and d. means for converting the mechanical deformation of the second diaphragm into a change in capacitance, the magnitude of the change corresponding to the fluid pressure acting on said first diaphragm;

said means for converting comprising an electrode acting in cooperation with said second diaphragm to form a variable capacitor, and said first diaphragm (i) having a diameter smaller than said second diaphragm, (ii) being formed of a material that is resistant to corrosion caused by said fluid and (iii) having a thickness less than that of said second diaphragm to provide a good responsiveness to the fluid pressure being measured.

2. The sensor of claim 1 further comprising means for sealing said first diaphragm to said container adjacent said fluid with one face of said first diaphragm acted upon by said fluid.

3. The sensor of claim 1 wherein said container is a conduit and said first diaphragm is mounted in the wall of said conduit so that there is substantially no dead volume.

4. A sensor for measuring the pressure of a fluid in a container comprising, a sensor head secured and sealed to said container at an opening in the container, an isolating diaphragm mounted in said sensor head and disposed adjacent to the fluid, said isolating diaphragm gathering the fluid pressure acting on it and producing a resultant force directed along a first direction perpendicular to the isolating diaphragm, a sensor body connected to said sensor head, a drive rod extending freely within the sensor head and the sensor body and rigidly mechanically coupled to the isolating diaphragm, said drive rod being substantially incompressible along its axis in response to said resultant force, means for converting the force applied to the drive rod means at said isolating diaphragm into a variable capacitance that corresponds to the fluid pressure acting on said isolating diaphragm, and second diaphragm means coupled to said drive rod for producing a counterforce acting on said isolating diaphragm in opposition to the force of said fluid pressure, said means for converting comprising an electrode acting in cooperation with said second diaphragm means to form a variable capacitor, said isolating diaphragm (i) having a diameter smaller than said second diaphragm means, (ii) being formed of a material that is resistant to corrosion caused by said fluid and (iii) having a thickness less than that of said second diaphragm diaphragm to provide good responsiveness to the fluid pressure being measured.

5. The sensor of claim 4, wherein the sensor head includes means for replaceably mounting the sensor to the container.

6. The sensor of claim 5, wherein the mounting means includes a threaded fitting capable of mating to a corresponding threaded fitting secured on the outer surface of said conduit.

7. The sensor of claims 1 or 4, wherein said means for converting comprises a movable electrode mounted to said second diaphragm at its center with a fixed spacing at this center mount and electrically isolated from said second diaphragm to form a variable gap capacitor between the periphery of said electrode and said second diaphragm.

8. The sensor of claim 4 wherein said isolating diaphragm is edge mounted and supported against said force at its center by said drive rod and said second diaphragm and wherein said isolating diaphragm has an annular convolution formed in its body to reduce stress in the diaphragm at its edge and center when the diaphragm is deformed by the applied fluid pressure.

9. The sensor of claim 8 wherein said convolution is generally semi-circular in cross-section and concave adjacent the fluid.

* * * * *